(12) United States Patent
Kapoor et al.

(10) Patent No.: US 10,613,525 B1
(45) Date of Patent: Apr. 7, 2020

(54) AUTOMATED HEALTH ASSESSMENT AND OUTAGE PREDICTION SYSTEM

(71) Applicant: Numerify, Inc., San Jose, CA (US)

(72) Inventors: Rahul Kapoor, Bellevue, WA (US); Gaurav Rewari, Cupertino, CA (US); Kari Clement, Newberg, OR (US)

(73) Assignee: Numerify, Inc., San Jose, CA (US)

( * ) Notice: Subject to any disclaimer, the term of this patent is extended or adjusted under 35 U.S.C. 154(b) by 303 days.

(21) Appl. No.: 15/660,671

(22) Filed: Jul. 26, 2017

(51) Int. Cl.
*G05B 23/02* (2006.01)

(52) U.S. Cl.
CPC ..... *G05B 23/0229* (2013.01); *G05B 23/0235* (2013.01); *G05B 23/0237* (2013.01)

(58) Field of Classification Search
CPC ............ G05B 23/0229; G05B 23/0235; G05B 23/0237
See application file for complete search history.

(56) References Cited

U.S. PATENT DOCUMENTS

| | | | |
|---|---|---|---|
| 7,159,146 B2* | 1/2007 | Bowers | H04L 41/0631 714/37 |
| 2015/0310086 A1* | 10/2015 | Tee | G06F 16/285 707/737 |
| 2018/0284736 A1* | 10/2018 | Cella | G05B 23/024 |

* cited by examiner

*Primary Examiner* — Elias Desta
(74) *Attorney, Agent, or Firm* — Rahman LLC

(57) ABSTRACT

Automatically assessing the health and predicting a probability of outage of a configuration item. A system automatically assesses the health of a configuration item and determines the probability of its outage by analyzing information associated with the current conditions of the configuration item obtained from an information technology service management (ITSM) system, an application performance management (APM) system or a machine data (MD) analysis system. The system further determines a probability of outage and health degradation of a set of configuration items impacted due to a Change by matching essence key phrases of the requested Change with outage predictor list for outage probability and health degradation predictor list for health degradation probability. The system further monitors configuration items impacted by a Change by analyzing information for the associated configuration items obtained from the ITSM, APM and MD analysis systems before and after the requested Change.

20 Claims, 9 Drawing Sheets

AUTOMATICALLY COMPUTING (A) A COMBINED PROBABILITY OF OUTAGE FOR THE CONFIGURATION ITEM BY DIVIDING THE CUMULATIVE OUTAGE SCORE WITH A FIRST TOTAL CONFIGURABLE WEIGHT AND (B) A COMBINED HEALTH ASSESSMENT OF THE CONFIGURATION ITEM BY DIVIDING THE CUMULATIVE HEALTH ASSESSMENT SCORE WITH A SECOND TOTAL CONFIGURABLE WEIGHT, WHEREIN THE FIRST TOTAL CONFIGURABLE WEIGHT IS CALCULATED BY ADDING THE FIRST CONFIGURABLE WEIGHT OF THE ITSM SYSTEM, THE FIRST CONFIGURABLE WEIGHT OF THE APM SYSTEM AND THE FIRST CONFIGURABLE WEIGHT OF THE MD ANALYSIS SYSTEM, WHEREIN THE SECOND TOTAL CONFIGURABLE WEIGHT IS CALCULATED BY ADDING THE SECOND CONFIGURABLE WEIGHT OF THE ITSM SYSTEM, THE SECOND CONFIGURABLE WEIGHT OF THE APM SYSTEM AND THE SECOND CONFIGURABLE WEIGHT OF THE MD ANALYSIS SYSTEM
620

FIG. 6C

AUTOMATED HEALTH ASSESSMENT AND OUTAGE PREDICTION SYSTEM

RELATED APPLICATION DATA

This application is related to U.S. non-provisional patent application Ser. No. 15/202,113, filed Jul. 5, 2016, entitled "Automated Incident, Problem, Change Correlation Analysis system," the contents of which are hereby incorporated by reference for all purposes as if fully set forth herein.

BACKGROUND

Technical Field

Embodiments discussed herein generally relate to approaches for automatically assessing the health of a hardware or software component and predicting a probability of outage.

Description of the Related Art

Outage refers to unavailability or a very significant decrease in quality of service due to unexpected behavior of that particular service. Hardware or software outages can lead to unexpected downtime and service level agreement (SLA) breaches that impact businesses significantly. Similarly, Changes can sometimes cause adverse impact on applications health which can also negatively impact businesses. However, there is no system or method that can effectively predict these outages.

Some existing systems use Prognostic Health Management (PHM) technology that utilizes both diagnostic and prognostic features to develop health indicators to assess the current health and predict the remaining lifetime of hardware (e.g., an electronic system). Information from systems such as an Information Technology Service Management (ITSM) system, an Application Performance Management (APM) system and a Machine Data (MD) analysis system can help to identify potential impending outages that could lead to degraded application/hardware health. However, it is cumbersome to correlate the information collected from the ITSM system, the APM system, and the MD analysis system as information received from each system is different.

For example, the ITSM system typically includes several process areas such as (a) Incident management that is focused on restoring normal service operation at the earliest, (b) Problem management that is focused on determining the root cause of Problems and preventing further Incidents, (c) Change management that is focused on ensuring that standardized methods and procedures are used for efficient and prompt handling of all Changes and (d) configuration management that tracks the potentially degraded application/hardware (e.g. a physical IT asset) as configuration items (CI's) along with their properties and relationships in a configuration management database.

The APM system typically includes application monitoring products to understand applications and data flows through applications, web services, message queues and databases. In the APM system, a business transaction is used to represent data processing flow for a request. User requests to applications are identified as entry points of a business transaction. The request path is traced from web servers to databases and other infrastructure components and performance metrics collected for each step processing the business transaction. The application monitoring products may define a score to measure the application performance. The machine data (MD) analysis system typically includes information such as application logs, business process logs, call detail records, clickstream data, configuration files, database audit logs, file system audit logs, management and logging application programming interfaces (APIs), message queues, operating system metrics, status and diagnostic commands, packet/flow data, sensor data, syslogs, web access log, web proxy logs, windows event and wire data etc.

The aforementioned systems may individually identify potential impending outages or factors that could lead to degraded application/hardware health, but, given they only use the information gathered by them individually, they are not very accurate in predicting the outage and assessing health of the degraded application/hardware.

Therefore, to overcome the existing problems and challenges, there remains a need for a system and method for automatically assessing the health and predicting the probability of an outage of an application or hardware component by correlating information collected from different systems.

BRIEF DESCRIPTION OF THE DRAWINGS

The embodiments herein will be better understood from the following detailed description with reference to the drawings, in which:

FIGS. 6A-6C are flow diagrams that illustrate a method for automatically assessing the health of a configuration item (CI) and predicting the probability of outage of the CI using the health assessment and outage prediction system of FIG. 1 according to an embodiment herein.

DETAILED DESCRIPTION OF PREFERRED EMBODIMENTS

Figure 1:
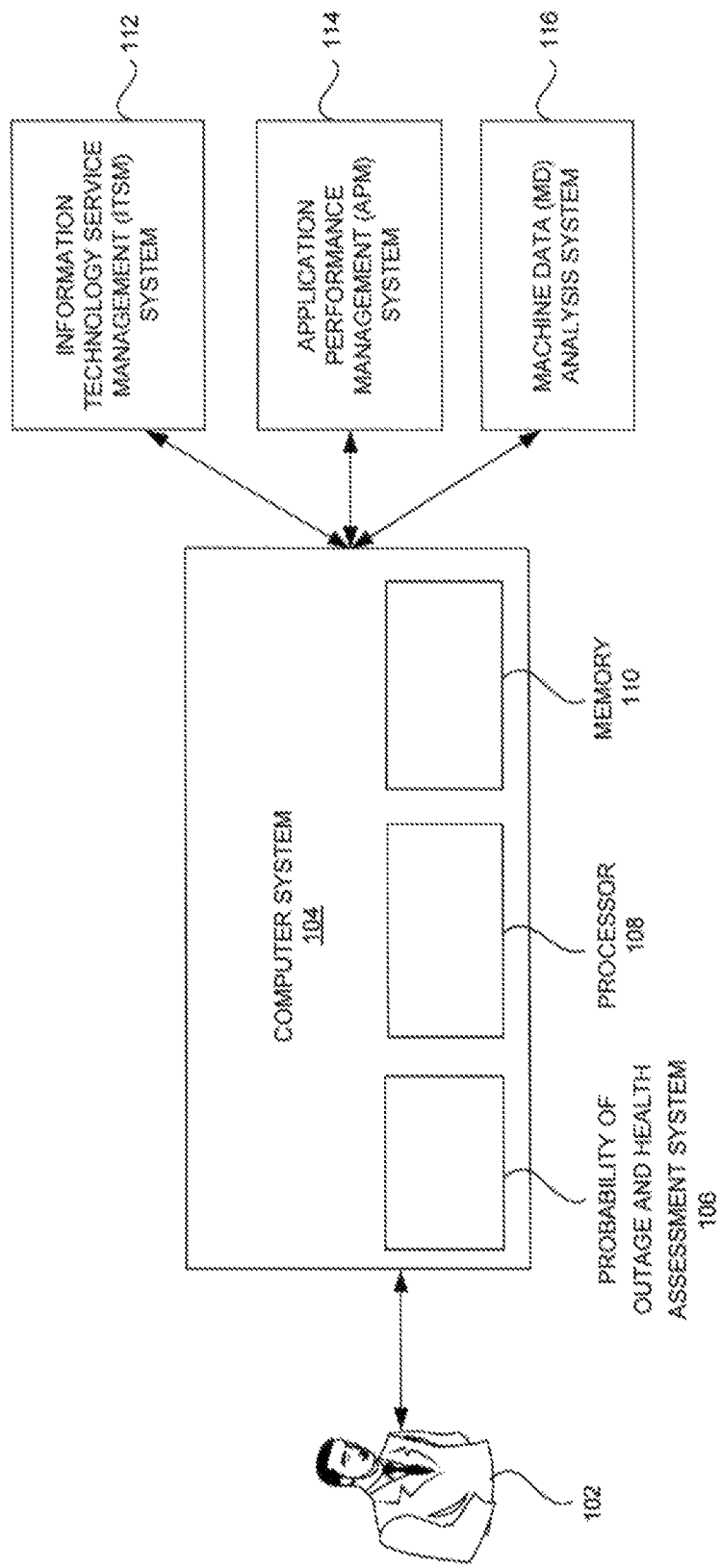
FIG. 1 is a system view illustrating a user interacting with a health assessment and outage prediction system using a computer system for automatically assessing the health of a configuration item (CI) and predicting the probability of outage of the CI according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide approaches for automatically predicting the probability of outage and assessing health of the configuration item using a health assessment and outage prediction system. Referring now to the drawings, and more particularly to FIGS. 1 through 7, where similar reference characters denote corresponding features consistently throughout the figures, preferred embodiments are shown.

The term "configuration item" (CI) refers to entities which may be physical IT assets (such as a computer or a router), logical (such as a database instance) or conceptual (such as an IT Service) that are tracked along with their properties and relationships in a Configuration Management database in an information technology service management (ITSM) system.

The term "Incident" refers to an unplanned interruption to a service, a reduction in the quality of a service or an event that has not yet impacted the service to a customer.

The term "Problem" refers to the root cause of related Incidents.

The term "Change" refers to a way to resolve a Problem. The Change is typically performed to resolve Incidents and Problems but may be the cause of new Incidents as well.

The term "essence key phrases" refers to phrases that are obtained by combining important keywords including related keywords that are identified using text analytics on textual fields of Incidents, Problem and Change records, with relevant structured fields of the Incident, Problem and Change records. The related keywords are identified by analyzing a keyword synonym map built using semantic analysis. In other words, the essence key phrases represent the essence of Incidents, Problems and Changes.

The term "health assessment" refers to assessing the health status of a configuration item (CI). The term "health" refers to a function of a condition of a configuration item.

The term "probability of outage" refers to a likelihood of unavailability or significant decrease in quality of a configuration item due to unexpected Problems with the configuration item.

The term "probability of health degradation" refers to a likelihood of degradation of the health of a configuration item.

The term "outage predictor list" refers to a list of outages for various configuration items associated with Incident, Problem and Change records obtained from one or more ITSM systems that is looked up using essence key phrases of Incident, Problem and Change records and tracks an Outage probability score for each class of Incident, Problem and Change.

The term "health degradation predictor list" refers to a list of health degradations for various configuration items associated with Change records that is looked up using essence key phrases of Change records and tracks a health degradation probability score for each class of Change.

The term "deviation" refers to a difference from a normal level or a threshold level.

The term "configurable weight" refers to a numerical factor denoting relative importance of each metric of Application Performance Management (APM) system, each factor of Machine Data (MD) analysis system or the relative weight of an Application Performance Management (APM) system, a Machine Data (MD) analysis system and an Information Technology Service Management (ITSM) system.

FIG. 1 is a system view illustrating a user 102 interacting with a health assessment and outage prediction system 106 using a computer system 104 for automatically assessing health of a configuration item (CI) and predicting the probability of outage of the CI according to an embodiment herein. The computer system 104 further includes a memory 110 that stores a database and a set of instructions, and a processor 108 that is configured by the set of instructions to execute the health assessment and outage prediction system 106. The database stores information associated with a current condition of the configuration item obtained from at least one of (a) an information technology service management (ITSM) system 112, (b) an application performance management (APM) system 114 or (c) a machine data (MD) analysis system 116. The health assessment and outage prediction system 106 automatically computes an outage predictor list and a health degradation predictor list. The health assessment and outage prediction system 106 automatically assesses the health of the configuration item and determines the probability of the outage of the configuration item by analyzing information associated with a current condition of the configuration item obtained from at least one of (a) the ITSM system 112, (b) the APM system 114 or (c) the MD analysis system 116.

The health assessment and outage prediction system 106 automatically obtains information related to active Incidents and Problems associated with the configuration item from the ITSM system 112 to determine (a) a probability of outage and (b) a health assessment for the configuration item from the ITSM system 112. The health assessment and outage prediction system 106 automatically obtains information related to deviations in key metrics of the configuration item from the APM system 114 to determine (a) a probability of outage and (b) a health assessment from the APM system 114 for the configuration item from the APM system. Similarly, the health assessment and outage prediction system 106 automatically obtains information related to deviations in key factors of the configuration item from the MD analysis system 116 to determine (a) a probability of outage and (b) a health assessment for the configuration item from the MD analysis system 116. The health assessment and outage prediction system 106 further automatically computes (a) a cumulative outage score and (b) a cumulative health assessment score based on the probability of the outage and the health assessment from the ITSM system 112, the APM system 114 and the MD analysis system 116. The health assessment and outage prediction system 106 further automatically computes (a) a combined probability of outage for the configuration item based on the cumulative outage score and a first configurable weight of the ITSM system 112, the APM system 114 and the MD analysis system 116, and (b) a combined health assessment of the configuration item based on the cumulative health assessment score and a second configurable weight of the ITSM system 112, the APM system 114 and the MD analysis system 116.

The health assessment and outage prediction system 106 automatically determines a probability of outage and health degradation of a set of configuration items impacted due to a Change. The health assessment and outage prediction system 106 further automatically monitors one or more configuration items impacted by a Change by analyzing information associated with the one or more configuration items obtained from at least one of (a) the ITSM system 112, (b) the APM system 114 or (c) the MD analysis system 116 before and after the requested Change. In an embodiment, the configuration item may be (a) a physical IT asset (e.g. a computer, a router etc.), (b) a logical asset (e.g. a database instance) or (c) a conceptual asset (e.g. an IT service).

Figure 2:
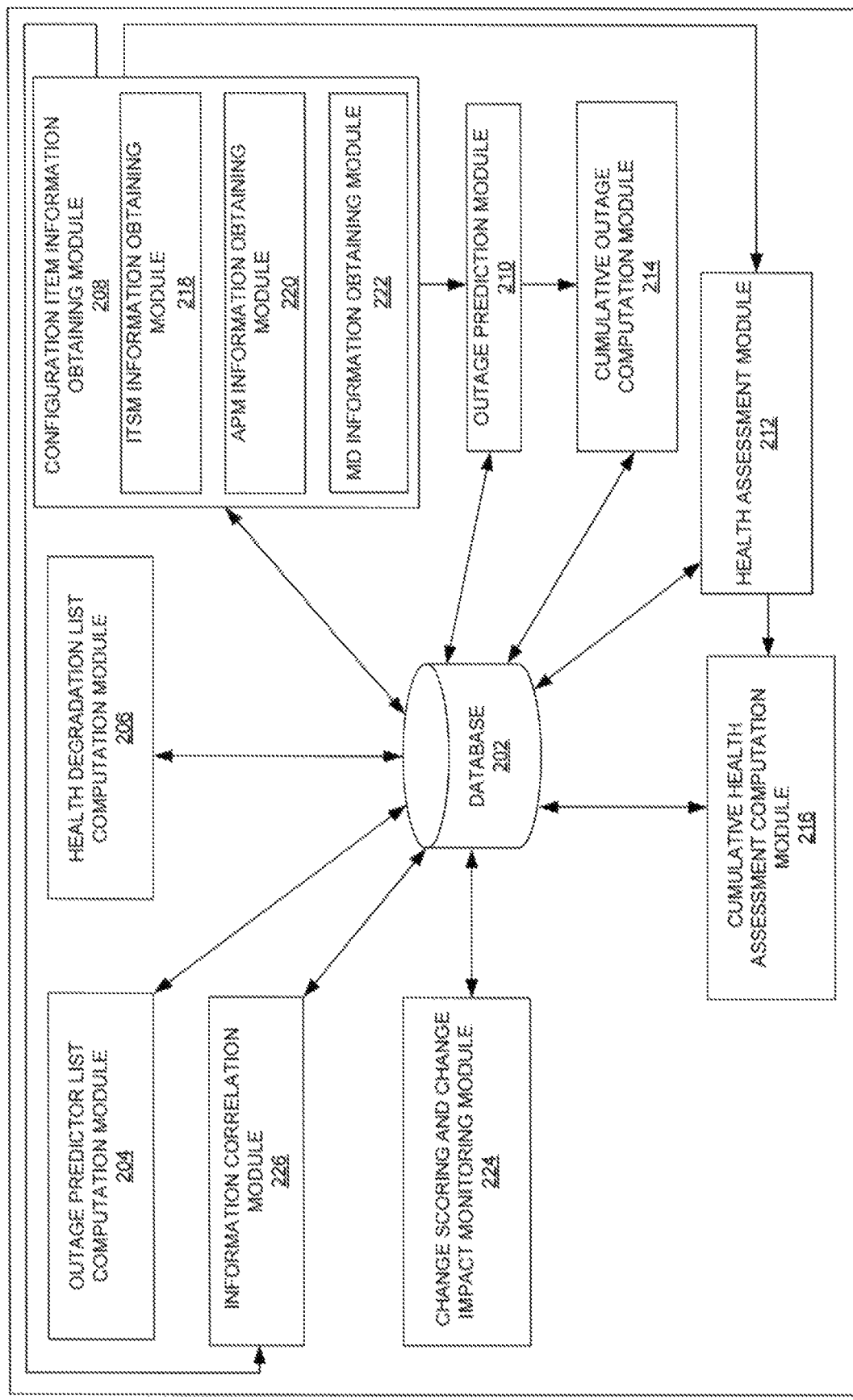
FIG. 2 illustrates an exploded view of the health assessment and outage prediction system of FIG. 1 according to an embodiment herein.

FIG. 2 illustrates an exploded view of the health assessment and outage prediction system 106 of FIG. 1 according to an embodiment herein. The health assessment and outage prediction system 106 includes a database 202, an outage predictor list computation module 204, a health degradation list computation module 206, a configuration item information obtaining module 208, an outage prediction module 210, a health assessment module 212, a cumulative outage computation module 214, a cumulative health assessment computation module 216, a Change scoring and Change impact monitoring module 224 and an information correlation module 226. The configuration item information obtaining module 208 includes an ITSM information obtaining module 218, an APM information obtaining module 220 and a MD information obtaining module 222. In an embodiment, the above said modules are executed by the processor 108. In another embodiment, the processor 108 implements a health assessment and outage probability determination process to assess the health of the configuration item (CI) and to predict the probability of outage of the CI.

The ITSM information obtaining module 218 automatically obtains information related to active Incidents and Problems associated with the configuration item from the ITSM system 112. The outage prediction module 210 automatically determines a probability of outage for the configuration item from the ITSM system 112 by matching essence key phrases of the active Incidents and Problems with the outage predictor list. The health assessment module 212 automatically determines a health assessment for the configuration item from the ITSM system 112 based on a difference in number of the Incidents and Problems from a normal level. The APM information obtaining module 220 automatically obtains information related to deviations in key metrics of the configuration item from the APM system 114. In an embodiment, the degradation in health is indicated by the key metrics that includes at least one of (a) an increase in error rates, (b) an increase in response time or (c) a decrease in application performance, from a normal level. The outage prediction module 210 automatically determines a probability of outage from the APM system 114 for the configuration item based on the deviations in the key metrics of the configuration item. Similarly, the health assessment module 212 automatically determines a health assessment from the APM system 114 for the configuration item based on the deviations in the key metrics of the configuration item. The MD information obtaining module 222 automatically obtains information related to deviations in key factors of the configuration item from the MD analysis system 116. In an embodiment, the degradation in health is indicated by the key factors that includes at least one of (a) critical errors from applications, (b) an alert from a message queue, (c) a critical event from an operating system and (d) critical errors from hardware components, of the configuration item, from a normal level. The outage prediction module 210 and the health assessment module 212 automatically determine a probability of outage and a health assessment for the configuration item respectively from the MD analysis system 116 based on the deviations in the key factors.

In an embodiment, the database 202 stores information associated with the current condition of the configuration item obtained from at least one of (a) the information technology service management (ITSM) system 112, (b) the application performance management (APM) system 114 or (c) the machine data (MD) analysis system 116. The outage predictor list computation module 204 automatically computes an outage predictor list by tracking essence key phrases of Incident, Problem and Change records that predict outages along with a probability that each class of the Incidents, Problems and Changes leads to an outage. In an embodiment, the Incident, Problem and Change records are obtained from one or more information technology service management (ITSM) systems. The outage predictor list computation module 204 further updates the outage predictor list by monitoring the impact of Changes and tracking information about the class of Changes leading to an outage after the Changes are executed. The outage predictor list computation module 204 further updates the outage predictor list based on the essence key phrases of related Incidents and Problems that are linked with the outage. In an embodiment, the outage predictor list includes outage probability scores correspond to various Incidents, Problems and Changes. The outage probability score is adjusted up or increased when a class of the Incidents, Problems and Changes leads to an outage. The outage probability score is adjusted down or decreased if there is no outage. Hence, the type of Incidents, Problems and Changes which frequently lead to outages have a higher outage probability score. The probability score adjusting mechanism is set-up such that the outage probability score is 1 if an outage occurs every time, and the outage probability score is 0 if an outage never occurs, and representative of the number of times an outage occurs if an outage occurs sometimes but not always.

The health degradation list computation module 206 automatically computes the health degradation predictor list by tracking essence key phrases of Changes that predict health degradation along with a probability that each class of Changes would lead to health degradation. The health degradation list computation module 206 further updates the health degradation predictor list by monitoring the impact of the Changes. In an embodiment, the health degradation predictor list includes health degradation probability scores correspond to various Changes. The health degradation probability score is increased when a class of change leads to health degradation. The health degradation probability score is decreased when a class of change does not lead to health degradation. Hence, the type of Changes which frequently lead to health degradation have a higher health degradation probability score. The probability score adjusting mechanism is set-up such that the health degradation probability score is 1 if health degradation occurs every time, and the health degradation probability score is 0 if health degradation never occurs, and representative of the number of times health degradation occurs if health degradation occurs sometimes but not always.

The cumulative outage computation module 214 automatically computes a cumulative outage score by adding (a) the probability of outage from the ITSM system 112 adjusted based on a first configurable weight of the ITSM system 112, (b) the probability of outage from the APM system 114 adjusted based on a first configurable weight of the APM system 114 and (c) the probability of outage from the MD analysis system 116 adjusted based on a first configurable weight of the MD analysis system 116. The cumulative outage computation module 214 divides the cumulative outage score with a first total configurable weight to obtain a combined probability of outage of the configuration item. The first total configurable weight is calculated by adding the first configurable weight of the ITSM system 112, the first configurable weight of the APM system 114 and the first configurable weight of the MD analysis system 116. Hence, the cumulative outage computation module 214 automatically computes the combined probability of outage for the configuration item based on the following equation:

$$P_{CI} = (P_{ITSM}*\text{Weight}_{ITSM} + P_{APM}*\text{Weight}_{APM} + P_{MD}*\text{Weight}_{MD})/(\text{Weight}_{ITSM} + \text{Weight}_{APM} + \text{Weigth}_{MD}),$$

where $P_{CI}$ is a combined probability of outage of the configuration item, $P_{ITSM}$ is a probability of outage from the ITSM system 112, $P_{APM}$ is a probability of outage from the APM system 114, $P_{MD}$ is a probability of outage from the MD analysis system 116, $\text{Weight}_{ITSM}$ is a configurable weight of the ITSM system 112, $\text{Weight}_{APM}$ is a configurable weight of the APM system 114 and Weight is a configurable weight of the MD analysis system 116.

The cumulative health assessment computation module 216 automatically computes a cumulative health assessment score by adding (A) the health assessment from the ITSM system 112 adjusted based on a second configurable weight of the ITSM system 112, (B) the health assessment from the APM system 114 adjusted based on a second configurable weight of the APM system 114 and (C) the health assessment from the MD analysis system 116 adjusted based on a second configurable weight of the MD analysis system 116. The cumulative health assessment computation module 216 divides the cumulative health assessment score with a second total configurable weight to obtain a combined health assessment of the configuration item. The second total configurable weight is calculated by adding the second configurable weight of the ITSM system 112, the second configurable weight of the APM system 114 and the second configurable weight of the MD analysis system 116. Hence, the cumulative health assessment computation module 216 automatically computes the combined health assessment based on the following equation:

$$H_{CI} = (H_{ITSM}*\text{Weight}_{ITSM} + H_{APM}*\text{Weight}_{APM} + H_{MD}*\text{Weight}_{MD})/(\text{Weight}_{ITSM} + \text{Weight}_{APM} + \text{Weigth}_{MD}),$$

where $H_{CI}$ is a combined health assessment of the configuration item, $H_{IFSM}$ is a health assessment from the ITSM system 112, $H_{APM}$ is a health assessment from the APM system 114, $H_{MD}$ is a health assessment from the MD analysis system 116, $\text{Weight}_{ITSM}$ is a configurable weight of the ITSM system 112, $\text{Weight}_{APM}$ is a configurable weight of the APM system 114 and Weight is a configurable weight of the MD analysis system 116.

The Change scoring and Change impact monitoring module 224 automatically determines a probability of outage and health degradation of a set of configuration items that are impacted due to a Change by (a) extracting essence key phrases of the requested Change and (b) matching the essence key phrases of the requested Change with the outage predictor list for outage probability and the health degradation predictor list for health degradation probability. The Change scoring and Change impact monitoring module 224 automatically monitors one or more configuration items impacted by a Change by analyzing information associated with the one or more configuration items obtained from at least one of (a) the ITSM system 112, (b) the APM system 114 or (c) the MD analysis system 116 before and after the requested Change. In an embodiment, the probability of outage and the health assessment of the configuration items due to the requested Change are automatically determined by implementing the health assessment and outage probability determination process. The information correlation module 226 automatically correlates information associated with the current condition of the configuration item obtained from (a) the ITSM system 112, (b) the APM system 114 or (c) the MD analysis system 116.

Figure 3:
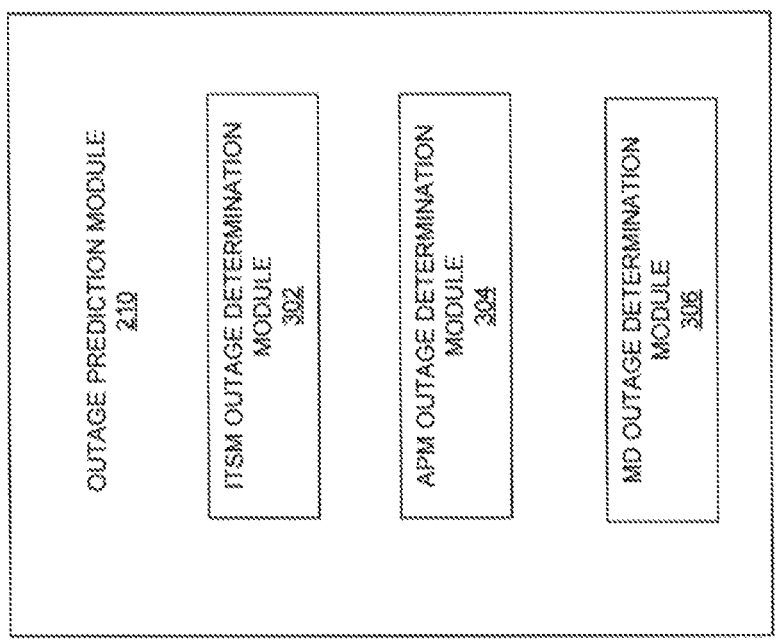
FIG. 3 illustrates an exploded view of an outage prediction module of FIG. 2 according to an embodiment herein.

FIG. 3 illustrates an exploded view of the outage prediction module 210 of FIG. 2 according to an embodiment herein. The exploded view of the outage prediction module 210 includes an ITSM outage determination module 302, an APM outage determination module 304 and a MD outage determination module 306.

The ITSM outage determination module 302 automatically determines a probability of outage from the ITSM system 112 for the configuration item by (A) automatically creating the essence key phrases for active Incidents or Problems associated with the configuration item by combining relevant structured fields of the active Incidents or Problems with important keywords including related keywords obtained by using text summarization techniques on descriptive fields of the active Incidents and Problems and (B) automatically comparing the essence key phrases of the active Incidents and Problems with the outage predictor list to determine the probability of outage from the ITSM system 112.

The APM outage determination module 304 automatically determines a probability of outage from the APM system 114 for the configuration item by (A) automatically monitoring the key metrics to identify deviations from a normal level, (B) automatically assigning a configurable weight and a probability of outage for each key metric based on the deviations and (C) automatically computing the probability of outage from the APM system 114 by combining the probability of outage of each key metric adjusted based on respective configurable weight as follows:

$$P_{APM} = (P_{Metric1}*\text{Weight}_1 + P_{Metric2}*\text{Weight}_2 + \ldots + P_{MetricN}*\text{Weight}_N)/(\text{Weight}_1 + \text{Weight}_2 + \ldots + \text{Weight}_N),$$

Where $P_{APM}$ is a probability of outage from the APM system 114, $P_{Metric1}$ is a probability of outage of a first key metric, $P_{Metric2}$ is a probability of outage of a second key metric, $P_{MetricN}$ is a probability of outage of $N^{th}$ key metric, $\text{Weight}_1$ is a configurable weight of the first key metric, $\text{Weight}_2$ is a configurable weight of the second key metric and $\text{Weight}_N$ is a configurable weight of the $N^{th}$ key metric.

In an embodiment, the configurable weight and the probability of outage are updated based on observations of the probability of outage and actual outage associated with each key metric over a period of time.

The MD outage determination module 306 automatically determines a probability of outage from the MD analysis system 116 for the configuration item by (A) automatically assigning a configurable weight and a probability of outage for each key factor based on deviations of the key factor from a normal level and (B) automatically computing the probability of outage from the MD analysis system 116 by combining the probability of outage of each key factor adjusted based on respective configurable weight as follows:

$$P_{MD} = (P_{Factor1}*\text{Weight}_1 + P_{Factor2}*\text{Weight}_2 + \ldots + P_{FactorN}*\text{Weight}_N)/(\text{Weight}_1 + \text{Weight}_2 + \ldots + \text{Weight}_N),$$

Where $P_{MD}$ is a probability of outage from the MD system 116, $P_{Factor1}$ is a probability of outage of a first key factor, $P_{Factor2}$ is a probability of outage of a second key factor, $P_{FactorN}$ is a probability of outage of $N^{th}$ key factor, $\text{Weight}_1$ is a configurable weight of the first key factor, $\text{Weight}_2$ is a configurable weight of the second key factor and $\text{Weight}_N$ is a configurable weight of the $N^{th}$ key factor.

In an embodiment, the configurable weight and the probability of outage are updated based on observations of the probability of outage and actual outage associated with each key factor over a period of time.

Figure 4:
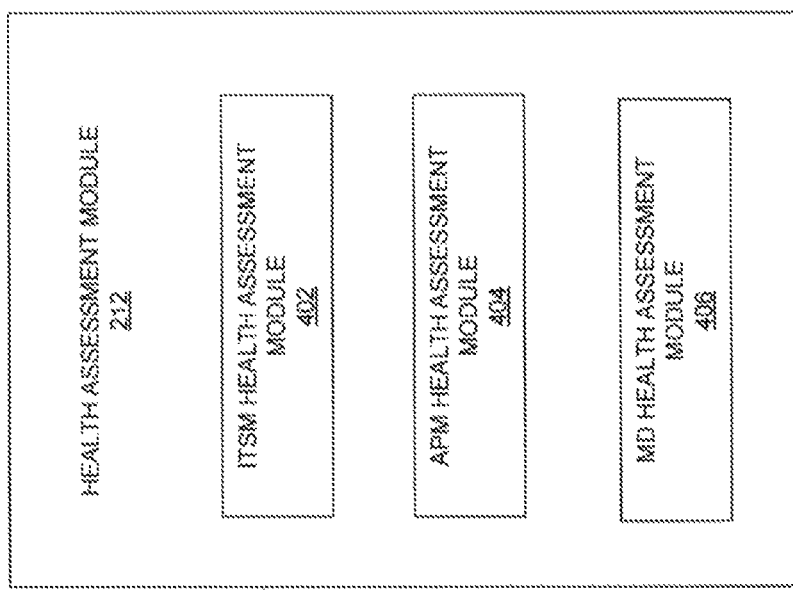
FIG. 4 illustrates an exploded view of a health assessment module of FIG. 2 according to an embodiment herein.

FIG. 4 illustrates an exploded view of the health assessment module 212 of FIG. 2 according to an embodiment herein. The exploded view of the health assessment module 212 includes an ITSM health assessment module 402, an APM health assessment module 404 and a MD health assessment module 406.

The ITSM health assessment module 402 automatically determines a health assessment of the configuration item from the ITSM system 112 by (A) automatically identifying the difference in the number of the active Incidents and Problems from a normal level and (B) automatically assigning a health assessment score based on the difference in number of the active Incidents and Problems from the normal level, to compute the health assessment from the ITSM system 112. In an embodiment, the active Incidents, optionally with the Problems are automatically clustered to identify clusters of related Incidents, Problems and Changes from the information related to active Incidents and Problems associated with the configuration item from the ITSM system 112 based on at least one of (a) a time of occurrence, (b) important keywords, (c) a category, or sub-category classification, (d) a related configuration item, (e) a group membership of a user who worked on and (f) outage records, associated with the Incidents and Problems.

The APM health assessment module 404 automatically determines a health assessment of the configuration item from the APM system 114 by (A) automatically assigning a health assessment score to each key metric based on the deviations of the key metric from a normal level and (B) automatically computing the health assessment from the APM system 114 by combining the health assessment score of each key metric adjusted based on respective configurable weight as follows:

$$H_{APM}=(H_{Metric1}*Weight_1+H_{Metric2}*Weight_2+ \ldots +H_{MetricN}*Weight_N)/(Weight_1+Weight_2+ \ldots +Weight_N),$$

Where $H_{APM}$ is a health assessment from the APM system 114, $H_{Metric1}$ is a health assessment score of a first key metric, $H_{Metric2}$ is a health assessment score of a second key metric, $H_{MetricN}$ is a health assessment score of $N^{th}$ key metric, $Weight_1$ is a configurable weight of the first key metric, $Weight_2$ is a configurable weight of the second key metric and $Weight_N$ is a configurable weight of the $N^{th}$ key metric.

The MD health assessment module 406 automatically determines a health assessment of the configuration item from the MD analysis system 116 by (A) automatically assigning a health assessment score to each key factor based on the deviations of the key factor from a normal level and (B) automatically computing the health assessment from the MD analysis system 116 by combining the health assessment score of each key factor adjusted based on respective configurable weight as follows:

$$H_{MD}=(H_{Factor1}*Weight_1+H_{Factor2}*Weight_2+ \ldots +H_{FactorN}*Weight_N)/(Weight_1+Weight_2+ \ldots +Weight_N),$$

Where $H_{MD}$ is a health assessment from the MD analysis system 116, $H_{Factor1}$ is a health assessment score of a first key factor, $H_{Factor2}$ is a health assessment score of a second key factor, $H_{FactorN}$ is a health assessment score of $N^{th}$ key factor, $Weight_1$ is a configurable weight of the first key factor, $Weight_2$ is a configurable weight of the second key factor and $Weight_N$ is a configurable weight of the $N^{th}$ key factor.

Figure 5:
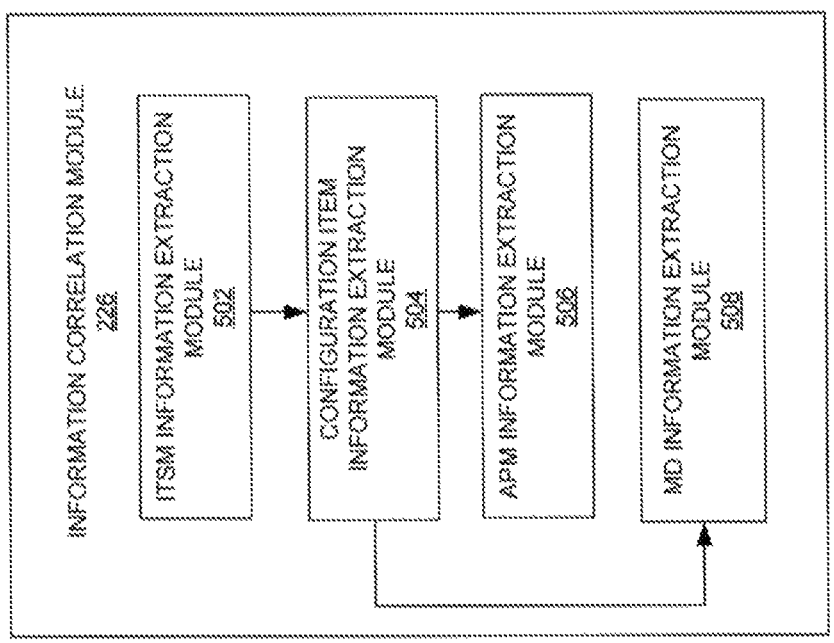
FIG. 5 illustrates an exploded view of an information correlation module of FIG. 2 according to an embodiment herein.

FIG. 5 illustrates an exploded view of the information correlation module 226 of FIG. 2 according to an embodiment herein. The exploded view of the information correlation module 226 includes an ITSM information extraction module 502, a configuration item information extraction module 504, an APM information extraction module 506 and a MD information extraction module 508. The ITSM information extraction module 502 automatically extracts a first subset of information associated with the configuration item from the ITSM system 112. The configuration item information extraction module 504 automatically extracts application information for the configuration item from a configuration item (CI) database. The APM information extraction module 506 automatically extracts a second subset of information for application matching configuration item from the APM system 114 based on the application information. The MD information extraction module 508 automatically extracts a third subset of information for application matching configuration item from the MD analysis system 116 based on the application information. The information correlation module 226 automatically combines the first subset of information, the second subset of information and the third subset of information to obtain the information associated with the current condition of the configuration item.

Figure 6A:
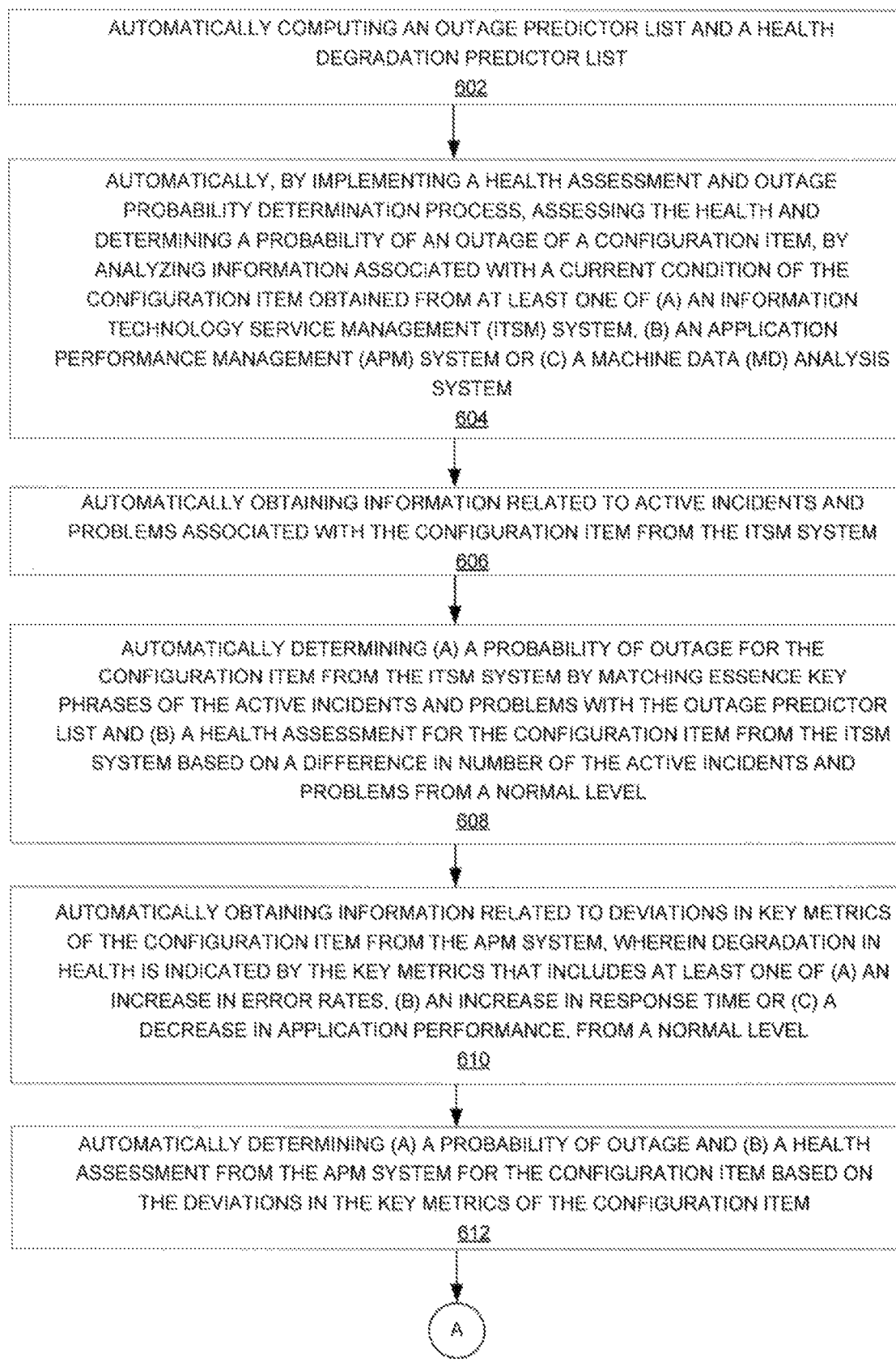
Figure 6B:
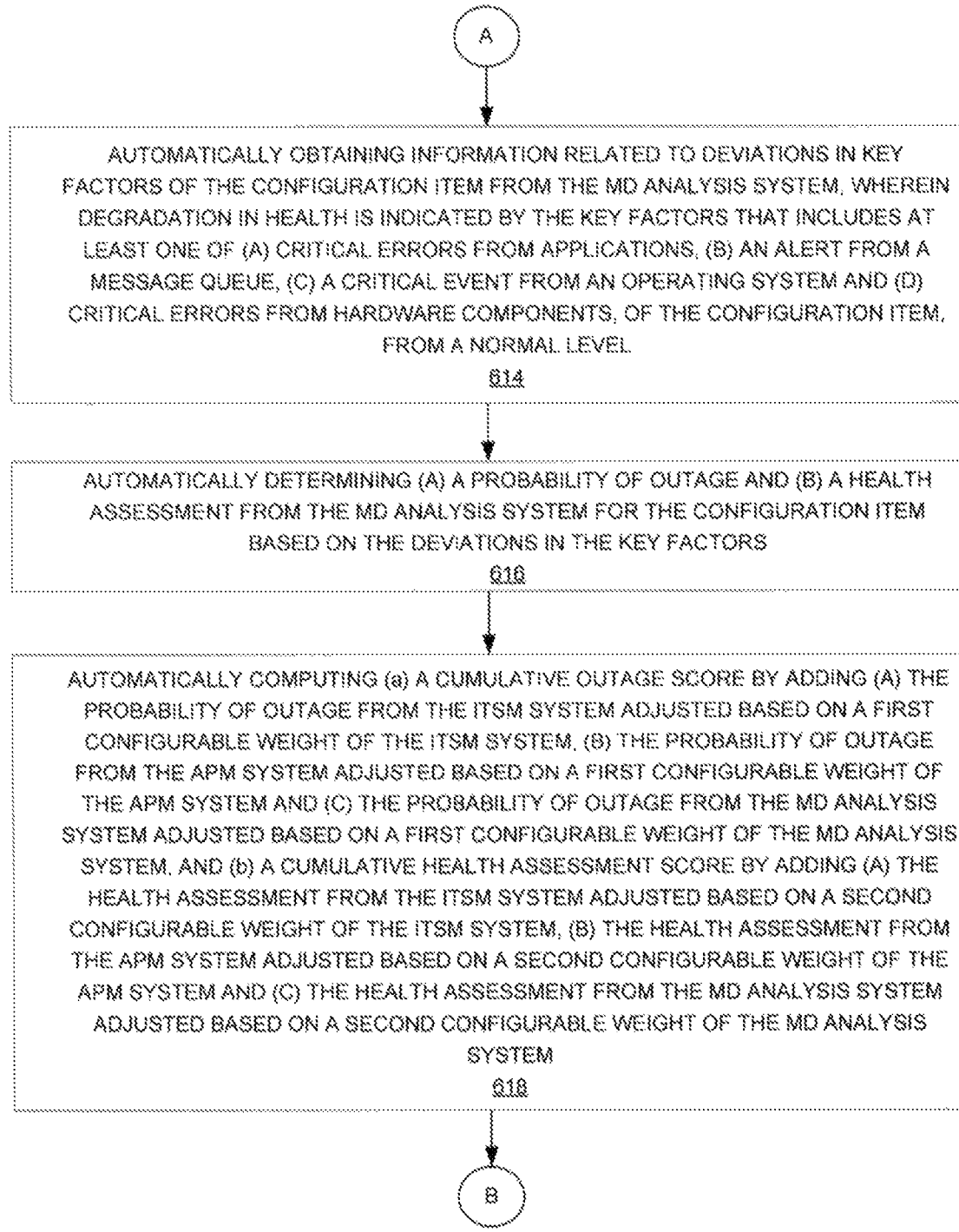

FIGS. 6A-6C are flow diagrams that illustrate a method for automatically assessing health of a configuration item (CI) and predicting the probability of outage of the CI using the health assessment and outage prediction system 106 of FIG. 1 according to an embodiment herein. At step 602, an outage predictor list and a health degradation predictor list are automatically computed. At step 604, by implementing a health assessment and outage probability determination process, the health of the configuration item is automatically assessed and a probability of an outage of the configuration item is automatically determined by analyzing information associated with a current condition of the configuration item obtained from at least one of (a) the ITSM system 112, (b) the APM system 114 and (c) the MD analysis system 116. At step 606, information related to active Incidents and Problems associated with the configuration item is automatically obtained from the ITSM system 112. At step 608, (a) a probability of outage for the configuration item from the ITSM system 112 by matching essence key phrases of the active Incidents and Problems with the outage predictor list and (b) a health assessment for the configuration item from the ITSM system 112 based on a difference in number of the active Incidents and Problems from a normal level are automatically determined. At step 610, information related to deviations in key metrics of the configuration item is automatically obtained from the APM system 114. The degradation in health is indicated by the key metrics that includes at least one of (a) an increase in error rates, (b) an increase in response time or (c) a decrease in application performance, from a normal level. At step 612, (a) a probability of outage and (b) a health assessment from the APM system 114 for the configuration item are automatically determined based on the deviations in the key metrics of the configuration item. At step 614, information related to deviations in key factors of the configuration item is automatically obtained from the MD analysis system 116. In an embodiment, degradation in health is indicated by the key factors that includes at least one of (a) critical errors from applications, (b) an alert from a message queue, (c) a critical event from an operating system and (d) critical errors from hardware components, of the configuration item, from a normal level. At step 616, (a) a probability of outage and (b) a health assessment from MD analysis system 116 for the configuration item are automatically determined based on the deviations in the key factors. At step 618, (a) a cumulative outage score is automatically computed by adding (A) the probability of outage from the ITSM system 112 adjusted based on a first configurable weight of the ITSM system 112, (B) the probability of outage from the APM system 114 adjusted based on a first configurable weight of the APM system 114 and (C) the probability of outage from the MD analysis system 116 adjusted based on a first configurable weight of the MD analysis system 116 and (b) a cumulative health assessment score is automatically computed by adding (A) the health assessment from the ITSM system 112 adjusted based on a second configurable weight of the ITSM system 112, (B) the health assessment from the APM system 114 adjusted based on a second configurable weight of the APM system 114 and (C) the health assessment from the MD analysis system 116 adjusted based on a second configurable weight of the MD analysis system 116. At step 620, (a) a combined probability of outage for the configuration item is automatically computed by dividing the cumulative outage score with a first total configurable weight and (b) a combined health assessment of the configuration item is automatically computed by dividing the cumulative health assessment score with a second total configurable weight. The first total configurable weight is calculated by adding the first configurable weight of the ITSM system 112, the first configurable weight of the APM system 114 and the first configurable weight of the MD analysis system 116. The second total configurable weight is calculated by adding the second configurable weight of the ITSM system 112, the second configurable weight of the APM system 114 and the second configurable weight of the MD analysis system 116.

Figure 7:
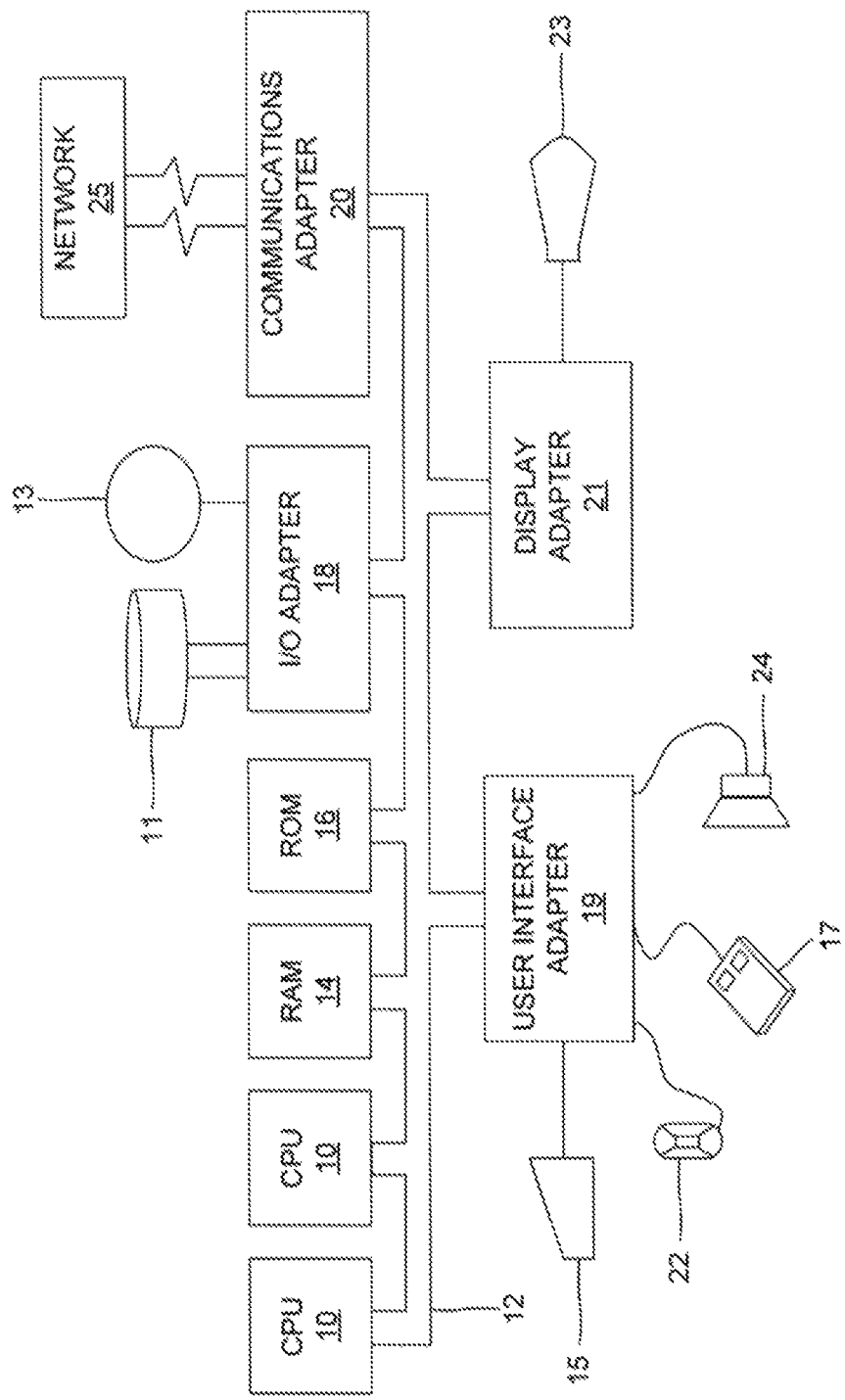
FIG. 7 is a computer system used in accordance with the embodiments herein.

FIG. 7, with reference to FIGS. 1 through 6C, is the computer system 104 of FIG. 1 used in accordance with the embodiments herein. The computer system 104 may include one or more of a personal computer, a laptop, a tablet device, a Smartphone, a mobile communication device, a personal digital assistant, or any other such computing device, in one example embodiment, in another example embodiment. This schematic drawing illustrates a hardware configuration of the computer system 104 in accordance with the embodiments herein. The computer system 104 includes one or more processor (e.g., the processor 108) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computer system 104 may be implemented with only one CPU.

The I/O adapter 18 can connect to peripheral devices, such as disk units 11 and tape drives 13, or other program storage devices that are readable by the system. The computer system 104 can read the inventive instructions on the program storage devices and follow these instructions to execute the methodology of the embodiments herein. The computer system 104 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions, which when executed by one or more processors, causes automatic health assessment of a configuration item (CI) and a prediction of a probability of an outage of said CI, by:

automatically computing an outage predictor list and a health degradation predictor list, wherein said outage predictor list comprises a list of outages for various configuration items associated with incident, problem and change records obtained from one or more information technology service management (ITSM) systems, wherein said health degradation predictor list comprises a list of health degradations for various configuration items associated with said change records;

automatically, by implementing a health assessment and outage probability determination process, assessing the health of said configuration item and determining a probability of an outage of said configuration item, by analyzing information associated with a current condition of said configuration item obtained from at least one of (a) an information technology service management (ITSM) system, (b) an application performance management (APM) system or (c) a machine data (MD) analysis system, wherein the health of said configuration item is a function of a condition of said configuration item, wherein said health assessment and outage probability determination process comprises:

(i) automatically obtaining information related to active incidents and problems associated with said configuration item from said ITSM system;

(ii) automatically determining (a) a probability of outage for said configuration item from said ITSM system by matching essence key phrases of said active incidents and problems with said outage predictor list and (b) a health assessment for said configuration item from said ITSM system based on a difference in number of said active incidents and problems from a normal level, wherein said essence key phrases are phrases that are obtained by combining important keywords including related keywords that are identified using text analytics on textual fields of said active incidents and problems with relevant structured fields of said incidents and problems;

(iii) automatically obtaining information related to deviations in key metrics of said configuration item from said APM system, wherein degradation in health is indicated by said key metrics that comprises at least one of (a) an increase in error rates, (b) an increase in response time or (c) a decrease in application performance, from a normal level;

(iv) automatically determining (a) a probability of outage and (b) a health assessment from said APM system for said configuration item based on the deviations in said key metrics of said configuration item;

(v) automatically obtaining information related to deviations in key factors of said configuration item from said MD analysis system, wherein degradation in health is indicated by said key factors that comprises at least one of (a) critical errors from applications, (b) an alert from a message queue, (c) a critical event from an operating system and (d) critical errors from hardware components, of said configuration item, from a normal level;

(vi) automatically determining (a) a probability of outage and (b) a health assessment from said MD analysis system for said configuration item based on the deviations in said key factors;

(vii) automatically computing (a) a cumulative outage score by adding (A) said probability of outage from said ITSM system adjusted based on a first configurable weight of said ITSM system, (B) said probability of outage from said APM system adjusted based on a first configurable weight of said APM system and (C) said probability of outage from said MD analysis system adjusted based on a first configurable weight of said MD analysis system, and (b) a cumulative health assessment score by adding (A) said health assessment from said ITSM system adjusted based on a second configurable weight of said ITSM system, (B) said health assessment from said APM system adjusted based on a second configurable weight of said APM system and (C) said health assessment from said MD analysis system adjusted based on a second configurable weight of said MD analysis system; and (viii) automatically computing (a) a combined probability of outage for said configuration item by dividing said cumulative outage score with a first total configurable weight and (b) a combined health assessment of said configuration item by dividing said cumulative health assessment score with a second total configurable weight, wherein said first total configurable weight is calculated by adding said first configurable weight of said ITSM system, said first configurable weight of said APM system and said first configurable weight of said MD analysis system, wherein said second total configurable weight is calculated by adding said second configurable weight of said ITSM system, said second configurable weight of said APM system and said second configurable weight of said MD analysis system;

automatically compiling the combined probability of outage and the combined health assessment of the CI in a health assessment and outage prediction system; and automatically integrating the health assessment and outage prediction system containing the combined probability of outage and the combined health assessment of the CI with a user interface device to gather user input based on observations of the combined probability of outage and the combined health assessment of the CI over a period of time.

2. The one or more non-transitory computer readable storage mediums storing one or more sequences of instructions of claim 1, which when executed by one or more processors further causes automatic determination of a probability of outage and health degradation of a set of configuration items impacted due to a change by (a) extracting essence key phrases of said requested change and (b) matching said essence key phrases of said requested change with said outage predictor list for outage probability and said health degradation predictor list for health degradation probability.

3. The one or more non-transitory computer readable storage mediums storing one or more sequences of instructions of claim 1, which when executed by one or more processors further causes automatic monitoring of a plurality of configuration items impacted by a change by analyzing information associated with said plurality of said configuration items obtained from at least one of (a) said ITSM system, (b) said APM system or (c) said MD analysis system before and after said requested change, wherein said probability of outage and said health assessment of said configuration item due to said requested change are automatically determined by implementing said health assessment and outage probability determination process.

4. The one or more non-transitory computer readable storage mediums storing one or more sequences of instructions of claim 1, wherein said outage predictor list is computed by tracking essence key phrases of said incident, problem and change records that predict outages along with a probability that each class of said incidents, problems and changes leads to an outage, wherein said outage predictor list is updated by monitoring the impact of said changes and modified by tracking information about the class of a change leading to said outage after said change is executed, wherein said outage predictor list is further updated based on essence key phrases of related incidents and problems that are linked with said outage.

5. The one or more non-transitory computer readable storage mediums storing one or more sequences of instructions of claim 1, wherein said health degradation predictor list is computed by tracking essence key phrases of changes that predict health degradation along with a probability that each class of said changes leads to health degradation, wherein said health degradation predictor list is updated by monitoring the impact of said changes.

6. The one or more non-transitory computer readable storage mediums storing one or more sequences of instructions of claim 1, wherein said probability of outage from said ITSM system is determined by:

automatically creating said essence key phrases for said active incidents or problems associated with said configuration item by combining relevant structured fields of said active incidents or problems with important keywords including related keywords obtained by using text summarization techniques on descriptive fields of said active incidents and problems; and automatically comparing said essence key phrases of said active incidents and problems with said outage predictor list to determine said probability of outage from said ITSM system.

7. The one or more non-transitory computer readable storage mediums storing one or more sequences of instructions of claim 1, wherein said probability of outage from said APM system is determined by:

automatically monitoring said key metrics to identify deviations from a normal level;

automatically assigning a configurable weight and a probability of outage for each key metric based on said deviations, wherein said configurable weight and said probability of outage are updated based on observations of said probability of outage and actual outage associated with each key metric over a period of time; and automatically computing said probability of outage from said APM system by combining said probability of outage of each key metric adjusted based on respective configurable weight.

8. The one or more non-transitory computer readable storage mediums storing one or more sequences of instructions of claim 1, wherein said probability of outage from said MD analysis system is determined by:
   automatically assigning a configurable weight and a probability of outage for each key factor based on deviations of said key factor from a normal level, wherein said configurable weight and said probability of outage are updated based on observations of said probability of outage and actual outage associated with each key factor over a period of time; and
   automatically computing said probability of outage from said MD analysis system by combining said probability of outage of each key factor adjusted based on respective configurable weight.

9. The one or more non-transitory computer readable storage mediums storing one or more sequences of instructions of claim 1, wherein said health assessment from said ITSM system is determined by:
   automatically identifying the difference in number of said active incidents and problems from a normal level; and
   automatically assigning a health assessment score based on the difference in number of said active incidents and problems from the normal level to compute said health assessment from said ITSM system.

10. The one or more non-transitory computer readable storage mediums storing one or more sequences of instructions of claim 1, wherein said health assessment from said APM system is determined by:
    automatically assigning a health assessment score to each key metric based on deviations of said key metric from a normal level; and
    automatically computing said health assessment from said APM system by combining said health assessment score of each key metric adjusted based on respective configurable weight.

11. The one or more non-transitory computer readable storage mediums storing one or more sequences of instructions of claim 1, wherein said health assessment from said MD analysis system is determined by:
    automatically assigning a health assessment score to each key factor based on deviations of said key factor from a normal level; and
    automatically computing said health assessment from said MD analysis system by combining said health assessment score of each key factor adjusted based on respective configurable weight.

12. The one or more non-transitory computer readable storage mediums storing one or more sequences of instructions of claim 1, which when executed by one or more processors further causes automatic correlation of information associated with said current condition of said configuration item obtained from (a) said ITSM system, (b) said APM system or (c) said MD analysis system by:
    automatically extracting a first subset of information associated with said configuration item from said ITSM system;
    automatically extracting application information for said configuration item from a Configuration Item database;
    automatically extracting a second subset of information for application matching configuration item from said APM system based on said application information;
    automatically extracting a third subset of information for application matching configuration item from said MD analysis system based on said application information; and
    automatically combining said first subset of information, said second subset of information and said third subset of information to obtain said information associated with said current condition of said configuration item.

13. A system for automatically assessing the health of a configuration item (CI) and predicting a probability of an outage of said CI, said system comprising:
    a memory that stores information associated with a current condition of a configuration item obtained from at least one of (a) an information technology service management (ITSM) system, (b) an application performance management (APM) system or (c) a machine data (MD) analysis system;
    a processor that executes said set of instructions, wherein said processor is configured to:
       automatically compute an outage predictor list and a health degradation predictor list, wherein said outage predictor list comprises a list of outages for various configuration items associated with incident, problem and change records obtained from one or more information technology service management (ITSM) systems, wherein said health degradation predictor list comprises a list of health degradations for various configuration items associated with said change records; and
       automatically, by implementing a health assessment and outage probability determination process, assess the health of said configuration item and determine a probability of an outage of said configuration item, by analyzing information associated with a current condition of said configuration item obtained from at least one of (a) said information technology service management (ITSM) system, (b) said application performance management (APM) system or (c) said machine data (MD) analysis system, wherein the health of said configuration item is a function of a condition of said configuration item, wherein said health assessment and outage probability determination process comprises:
          (i) automatically obtaining information related to active incidents and problems associated with said configuration item from said ITSM system;
          (ii) automatically determining (a) a probability of outage for said configuration item from said ITSM system by matching essence key phrases of said active incidents and problems with said outage predictor list and (b) a health assessment for said configuration item from said ITSM system based on a difference in number of said active incidents and problems from a normal level, wherein said essence key phrases are phrases that are obtained by combining important keywords including related keywords that are identified using text analytics on textual fields of said active incidents and problems with relevant structured fields of said incidents and problems;
          (iii) automatically obtaining information related to deviations in key metrics of said configuration item from said APM system, wherein degradation in health is indicated by said key metrics that comprises at least one of (a) an increase in error rates, (b) an increase in response time or (c) a decrease in application performance, from a normal level;

(iv) automatically determining (a) a probability of outage and (b) a health assessment from said APM system for said configuration item based on the deviations in said key metrics of said configuration item;

(v) automatically obtaining information related to deviations in key factors of said configuration item from said MD analysis system, wherein degradation in health is indicated by said key factors that comprises at least one of (a) critical errors from applications, (b) an alert from a message queue, (c) a critical event from an operating system and (d) critical errors from hardware components, of said configuration item, from a normal level;

(vi) automatically determining (a) a probability of outage and (b) a health assessment from said MD analysis system for said configuration item based on the deviations in said key factors;

(vii) automatically computing (a) a cumulative outage score by adding (A) said probability of outage from said ITSM system adjusted based on a first configurable weight of said ITSM system, (B) said probability of outage from said APM system adjusted based on a first configurable weight of said APM system and (C) said probability of outage from said MD analysis system adjusted based on a first configurable weight of said MD analysis system, and (b) a cumulative health assessment score by adding (A) said health assessment from said ITSM system adjusted based on a second configurable weight of said ITSM system, (B) said health assessment from said APM system adjusted based on a second configurable weight of said APM system and (C) said health assessment from said MD analysis system adjusted based on a second configurable weight of said MD analysis system; and (viii) automatically computing (a) a combined probability of outage for said configuration item by dividing said cumulative outage score with a first total configurable weight and (b) a combined health assessment of said configuration item by dividing said cumulative health assessment score with a second total configurable weight, wherein said first total configurable weight is calculated by adding said first configurable weight of said ITSM system, said first configurable weight of said APM system and said first configurable weight of said MD analysis system, wherein said second total configurable weight is calculated by adding said second configurable weight of said ITSM system, said second configurable weight of said APM system and said second configurable weight of said MD analysis system;

automatically compiling the combined probability of outage and the combined health assessment of the CI in a health assessment and outage prediction system; and automatically integrating the health assessment and outage prediction system containing the combined probability of outage and the combined health assessment of the CI with a user interface device to gather user input based on observations of the combined probability of outage and the combined health assessment of the CI over a period of time.

14. The system of claim 13, wherein said processor is further configured to automatically determine a probability of outage and health degradation of a set of configuration items impacted due to a change by (a) extracting essence key phrases of said requested change and (b) matching said essence key phrases of said requested change with said outage predictor list for outage probability and said health degradation predictor list for health degradation probability.

15. The system of claim 13, wherein said processor is further configured to automatically monitor a plurality of configuration items impacted by a change by analyzing information associated with said plurality of said configuration items obtained from at least one of (a) said ITSM system, (b) said APM system or (c) said MD analysis system before and after said requested change, wherein said probability of outage and said health assessment of said configuration item due to said requested change are automatically determined by implementing said health assessment and outage probability determination process.

16. The system of claim 13, wherein said processor is configured to compute said outage predictor list by tracking essence key phrases of said incident, problem and change records that predict outages along with a probability that each class of said incidents, problems and changes leads to an outage, wherein said outage predictor list is updated by monitoring the impact of said changes and modified by tracking information about the class of a change leading to said outage after said change is executed, wherein said outage predictor list is further updated based on essence key phrases of related incidents and problems that are linked with said outage.

17. The system of claim 13, wherein said processor is configured to compute said health degradation predictor list by tracking essence key phrases of changes that predict health degradation along with a probability that each class of said changes leads to health degradation, wherein said health degradation predictor list is updated by monitoring the impact of said changes.

18. The system of claim 13, wherein said processor is configured to determine (a) said probability of outage from said ITSM system by (A) automatically creating said essence key phrases for said active incidents or problems associated with said configuration item by combining relevant structured fields of said active incidents or problems with important keywords including related keywords obtained by using text summarization techniques on descriptive fields of said active incidents and problems, and (B) automatically comparing said essence key phrases of said active incidents and problems with said outage predictor list to determine said probability of outage from said ITSM system, (b) said probability of outage from said APM system by (A) automatically monitoring said key metrics to identify deviations from a normal level, (B) automatically assigning a configurable weight and a probability of outage for each key metric based on said deviations, wherein said configurable weight and said probability of outage are updated based on observations of said probability of outage and actual outage associated with each key metric over a period of time and (C) automatically computing said probability of outage from said APM system by combining said probability of outage of each key metric adjusted based on respective configurable weight and (c) said probability of outage from said MD analysis system by (A) automatically assigning a configurable weight and a probability of outage for each key factor based on deviations of said key factor from a normal level, wherein said configurable weight and said probability of outage are updated based on observations of said probability of outage and actual outage associated with each key factor over a period of time and (B) automatically computing said probability of outage from said MD analysis system by combining said probability of outage of each key factor adjusted based on respective configurable weight.

19. The system of claim 13, wherein said processor is configured to determine (a) said health assessment from said ITSM system by (A) automatically identifying the difference in number of said active incidents and problems from a normal level and (B) automatically assigning a health assessment score based on the difference in number of said active incidents and problems from the normal level to compute said health assessment from said ITSM system, (b) said health assessment from said APM system by (A) automatically assigning a health assessment score to each key metric based on deviations of said key metric from a normal level and (B) automatically computing said health assessment from said APM system by combining said health assessment score of each key metric adjusted based on respective configurable weight and (c) said health assessment from said MD analysis system by (A) automatically assigning a health assessment score to each key factor based on deviations of said key factor from a normal level and (B) automatically computing said health assessment from said MD analysis system by combining said health assessment score of each key factor adjusted based on respective configurable weight.

20. A computer implemented method for automatically assessing the health of a configuration item (CI) and predicting a probability of an outage of said CI, said method comprising:
  automatically computing an outage predictor list and a health degradation predictor list, wherein said outage predictor list comprises a list of outages for various configuration items associated with incident, problem and change records obtained from one or more information technology service management (ITSM) systems, wherein said health degradation predictor list comprises a list of health degradations for various configuration items associated with said change records; and
  automatically, by implementing a health assessment and outage probability determination process, assessing the health of said configuration item and determining a probability of an outage of said configuration item, by analyzing information associated with a current condition of said configuration item obtained from at least one of (a) an information technology service management (ITSM) system, (b) an application performance management (APM) system or (c) a machine data (MD) analysis system, wherein the health of said configuration item is a function of a condition of said configuration item, wherein said health assessment and outage probability determination process comprises:
    (i) automatically obtaining information related to active incidents and problems associated with said configuration item from said ITSM system;
    (ii) automatically determining (a) a probability of outage for said configuration item from said ITSM system by matching essence key phrases of said active incidents and problems with said outage predictor list and (b) a health assessment for said configuration item from said ITSM system based on a difference in number of said active incidents and problems from a normal level, wherein said essence key phrases are phrases that are obtained by combining important keywords including related keywords that are identified using text analytics on textual fields of said active incidents and problems with relevant structured fields of said incidents and problems;
    (iii) automatically obtaining information related to deviations in key metrics of said configuration item from said APM system, wherein degradation in health is indicated by said key metrics that comprises at least one of (a) an increase in error rates, (b) an increase in response time or (c) a decrease in application performance, from a normal level;
    (iv) automatically determining (a) a probability of outage and (b) a health assessment from said APM system for said configuration item based on said deviations in key metrics of said configuration item;
    (v) automatically obtaining information related to deviations in key factors of said configuration item from said MD analysis system, wherein degradation in health is indicated by said key factors that comprises at least one of (a) critical errors from applications, (b) an alert from a message queue, (c) a critical event from an operating system and (d) critical errors from hardware components, of said configuration item, from a normal level;
    (vi) automatically determining (a) a probability of outage and (b) a health assessment from said MD analysis system for said configuration item based on the deviations in said key factors;
    (vii) automatically computing (a) a cumulative outage score by adding (A) said probability of outage from said ITSM system adjusted based on a first configurable weight of said ITSM system, (B) said probability of outage from said APM system adjusted based on a first configurable weight of said APM system and (C) said probability of outage from said MD analysis system adjusted based on a first configurable weight of said MD analysis system, and (b) a cumulative health assessment score by adding (A) said health assessment from said ITSM system adjusted based on a second configurable weight of said ITSM system, (B) said health assessment from said APM system adjusted based on a second configurable weight of said APM system and (C) said health assessment from said MD analysis system adjusted based on a second configurable weight of said MD analysis system; and
    (viii) automatically computing (a) a combined probability of outage for said configuration item by dividing said cumulative outage score with a first total configurable weight and (b) a combined health assessment of said configuration item by dividing said cumulative health assessment score with a second total configurable weight, wherein said first total configurable weight is calculated by adding said first configurable weight of said ITSM system, said first configurable weight of said APM system and said first configurable weight of said MD analysis system, wherein said second total configurable weight is calculated by adding said second configurable weight of said ITSM system, said second configurable weight of said APM system and said second configurable weight of said MD analysis system;
  automatically compiling the combined probability of outage and the combined health assessment of the CI in a health assessment and outage prediction system; and
  automatically integrating the health assessment and outage prediction system containing the combined probability of outage and the combined health assessment of the CI with a user interface device to gather user input based on observations of the combined probability of outage and the combined health assessment of the CI over a period of time.

* * * * *